US005241669A

United States Patent [19]

Cohn et al.

[11] Patent Number: 5,241,669

[45] Date of Patent: Aug. 31, 1993

[54] METHOD AND SYSTEM FOR SIDEFILE STATUS POLLING IN A TIME ZERO BACKUP COPY PROCESS

[75] Inventors: Oded Cohn, Haifa, Israel; Michael H. Hartung, Tucson, Ariz.; William F. Micka, Tucson, Ariz.; John N. McCauley, Jr., Tucson, Ariz.; Claus W. Mikkelsen, Morgan Hill, Calif.; Kenneth M. Nagin, Tucson, Ariz.

[73] Assignee: International Business Machines Corporation, Armonk, N.Y.

[21] Appl. No.: 871,786

[22] Filed: Apr. 20, 1992

[51] Int. Cl.[5] .............................................. G06F 11/00
[52] U.S. Cl. ..................................... 395/575; 395/400
[58] Field of Search ....................... 395/575, 428, 250; 364/260.2, 268.2, 282.1

[56] References Cited

U.S. PATENT DOCUMENTS 5,165,031 11/1992 Pruul et al. ........................ 395/575

*Primary Examiner*—Vincent P. Canney
*Attorney, Agent, or Firm*—Andrew J. Dillon

[57] ABSTRACT

A method and system are disclosed for enhanced efficiency of backup copying of designated datasets stored within a plurality of storage devices coupled to the data processing system via a storage subsystem control unit having subsystem memory therein. Application execution within the data processing system is temporarily suspended long enough to form a dataset logical-to-physical system address concordance to be utilized to administer copying of the designated dataset. Thereafter, application initiated updates to uncopied portions of the designated datasets are temporarily deferred until sidefiles of the affected portions of the designated datasets are written to subsystem memory. The updates are then written to the storage subsystem. Portions of the designated datasets are then accessed and copied from the storage subsystem on a scheduled or opportunistic basis utilizing selected data retrieval command sequences. A sidefile status query is appended to selected data retrieval command sequences and the presence of data within the subsystem memory is determined without the necessity of additional communications between the data processing system and the storage subsystem. The sidefiles are then accessed and copied. Copied portions of the designated datasets and sidefiles are then copied to alternate storage locations in a backup copy order defined by the address concordance.

13 Claims, 5 Drawing Sheets

METHOD AND SYSTEM FOR SIDEFILE STATUS POLLING IN A TIME ZERO BACKUP COPY PROCESS

CROSS-REFERENCE TO RELATED APPLICATION

The present application is related to U.S. patent application Ser. No. 07/781,044, entitled Method and Means for Time Zero Backup Copying of Data, filed Oct. 18, 1991, and assigned to the assignee herein named. The contents of the cross-reference United States Patent Application are hereby incorporated herein by reference thereto.

BACKGROUND OF THE INVENTION

1. Technical Field

The present invention relates in general to methods and systems for permitting backup copying of datasets in external storage associated with accessing data processing systems, and in particular the present invention relates to backup copying of datasets in external storage utilizing sidefile storage of updated portions of the designated datasets. Still more particularly, the present invention relates to a method and system for automatic sidefile polling in a data processing system during a time zero backup copying operation.

2. Description of the Related Art

A modern data processing system must be prepared to recover, not only from corruptions of stored data which occur as a result of noise bursts, software bugs, media defects, and write path errors, but also from global events, such as data processing system power failure. The most common technique of ensuring the continued availability of data within a data processing system is to create one or more copies of selected datasets within a data processing system and store those copies in a nonvolatile environment. This so-called "backup" process occurs within state-of-the-art external storage systems in modern data processing systems.

Backup policies are implemented as a matter of scheduling. Backup policies have a space and time dimension which is exemplified by a range of datasets and by the frequency of backup occurrence. A FULL backup requires the backup of an entire range of a dataset, whether individual portions of that dataset have been updated or not. An INCREMENTAL backup copies only that portion of the dataset which has been updated since a previous backup, either full or incremental. The backup copy thus created represents a consistent view of the data within the dataset as of the time the copy was created.

Of course, those skilled in the art will appreciate that as a result of the process described above, the higher the backup frequency, the more accurately the backup copy will mirror the current state of data within a dataset. In view of the large volumes of data maintained within a typical state-of-the-art data processing system backing up that data is not a trivial operation. Thus, the opportunity cost of backing up data within a dataset may be quite high on a large multiprocessing, multiprogramming facility, relative to other types of processing.

Applications executed within a data processing system are typically executed in either a batch (streamed) or interactive (transactional) mode. In a batch mode, usually one application at a time executes without interruption. Interactive mode is characterized by interrupt driven multiplicity of applications or transactions.

When a data processing system is in the process of backing up data in either a streamed or batch mode system, each process, task or application within the data processing system is affected. That is, the processes supporting streamed or batch mode operations are suspended for the duration of the copying. Those skilled in the art will recognize that this event is typically referred to as a "backup window." In contrast to batch mode operations, log based or transaction management applications are processed in the interactive mode. Such transaction management applications eliminate the "backup window" by concurrently updating an on-line dataset and logging the change. However, this type of backup copying results in a consistency described as "fuzzy." That is, the backup copy is not a precise "snapshot" of the state of a dataset/data base at a single point in time. Rather, a log comprises an event file requiring further processing against the database.

A co-pending U.S. patent application Ser. No. 07/385,647, filed Jul. 25, 1989, entitled A Computer Based Method For Dataset Copying Using an Incremental Backup Policy, illustrates backup in a batch mode system utilizing a modified incremental policy. A modified incremental policy copies only new data or data updates since the last backup. It should be noted that execution of applications within the data processing system are suspended during copying in this system.

As described above, to establish a prior point of consistency in a log based system, it is necessary to "repeat history" by replaying the log from the last check point over the datasets or database of interest. The distinction between batch mode and log based backup is that the backup copy is consistent and speaks as of the time of its last recordation, whereas the log and database mode require further processing in the event of a fault, in order to exhibit a point in time consistency.

U.S. Pat. No. 4,507,751, Gawlick et al., entitled *Method and Apparatus for Logging Journal Data Using a Write Ahead Dataset*, issued Mar. 25, 1985, exemplifies a transaction management system wherein all transactions are recorded on a log on a write-ahead dataset basis. As described within this patent, a unit of work is first recorded on the backup medium (log) and then written to its external storage address.

Co-pending U.S. patent application Ser. No. 07/524,206, filed May 16, 1990, entitled *Method and Apparatus for Executing Critical Disk Access Commands*, teaches the performance of media maintenance on selected portions of a tracked cyclic operable magnetic media concurrent with active access to other portions of the storage media. The method described therein requires the phased movement of customer data between a target track to an alternate track, diversion of all concurrent access requests to the alternate track or tracks and the completion of maintenance and copy back from the alternate to the target track.

Requests and interrupts which occur prior to executing track-to-track customer data movement result in the restarting of the process. Otherwise, requests and interrupts occurring during execution of the data movement view a DEVICE BUSY state. This typically causes a requeueing of the request.

In view of the complex nature of backup copying data, it should therefore be apparent that a need exists for a method and system for enhancing the efficiency of the backup copy process.

SUMMARY OF THE INVENTION

It is therefore one object of the present invention to provide an improved method and system for backup copying of datasets in external storage associated with accessing data processing systems.

It is another object of the present invention to provide an improved method and system for backup copying of designated datasets in external storage utilizing sidefile storage of updated portions of the designated datasets.

It is yet another object of the present invention to provide an improved method and system for automatic sidefile polling in a data processing system during a time zero backup copying operation.

The foregoing objects are achieved as is now described. A method and system are disclosed for enhanced efficiency of backup copying of designated datasets stored within a plurality of storage devices coupled to the data processing system via a storage subsystem control unit having subsystem memory therein. Application execution within the data processing system is temporarily suspended long enough to form a dataset logical-to-physical system address concordance to be utilized to administer copying of the designated dataset. Thereafter, application initiated updates to uncopied portions of the designated datasets are temporarily deferred until sidefiles of the affected portions of the designated datasets are written to subsystem memory. The updates are then written to the storage subsystem. Portions of the designated datasets are then accessed and copied from the storage subsystem on a scheduled or opportunistic basis utilizing selected data retrieval command sequences. A sidefile status query is appended to selected data retrieval command sequences and the presence of data within the subsystem memory is determined without the necessity of additional communications between the data processing system and the storage subsystem. The sidefiles are then accessed and copied. Copied portions of the designated datasets and sidefiles are then copied to alternate storage locations in a backup copy order defined by the address concordance.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
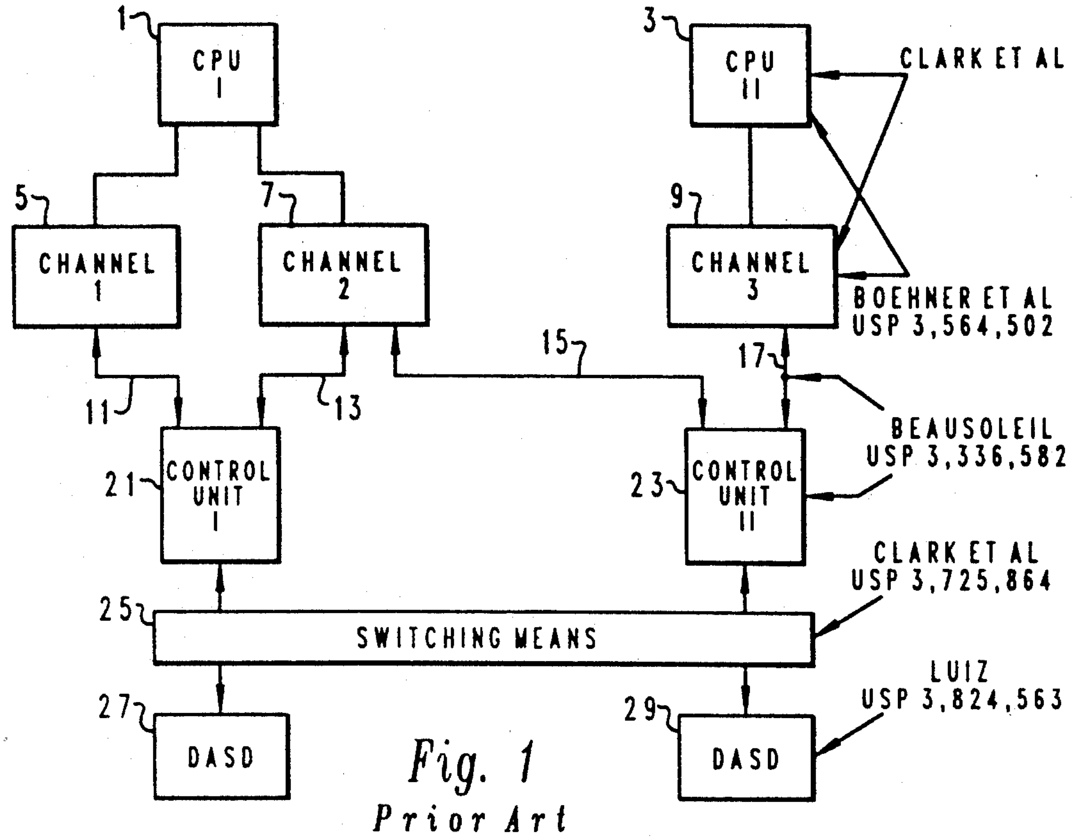
FIG. 1 depicts a typical multiprocessing, multiprogramming environment according to the prior art where executing processors and applications randomly or sequentially access data from external storage.

With reference now to the figures and in particular with reference to FIG. 1, there is depicted a multiprocessing, multiprogramming data processing system according to the prior art. Such systems typically include a plurality of processors 1 and 3 which access external storage units 21,23,25,27, and 29 over redundant channel demand/response interfaces 5, 7 and 9.

The illustrated embodiment in FIG. 1 may be provided in which each processor within the data processing system is implemented utilizing an IBM/360 or 370 architected processor type having, as an example, an IBM MVS operating system. An IBM/360 architected processor is fully described in Amdahl et al., U.S. Pat. No. 3,400,371, entitled Data Processing System, issued on Sep. 3, 1968. A configuration in which multiple processors share access to external storage units is set forth in Luiz et al., U.S. Pat. No. 4,207,609, entitled Path Independent Device Reservation and Reconnection in a Multi-CPU and Shared Device Access System, issued Jan. 10, 1980.

The MVS operating system is also described in IBM Publication GC28-1150, entitled MVS/*Extended Architecture System Programming Library: System Macros and Facilities*, Vol. 1. Details of standard MVS or other operating system services, such as local lock management, subsystem invocation by interrupt or monitor, and the posting and waiting of tasks is omitted. These operating systems services are believed to be well known to those having skill in this art.

Still referring to FIG. 1, as described in Luiz et al., a processor process may establish a path to externally stored data in an IBM System 370 or similar system through an MVS or other known operating system by invoking a START I/O, transferring control to a channel subsystem which reserves a path to the data over which transfers are made. Typically, executing applications have data dependencies and may briefly suspend operations until a fetch or update has been completed. During such a transfer, the path is locked until the transfer is completed.

Figure 2A:
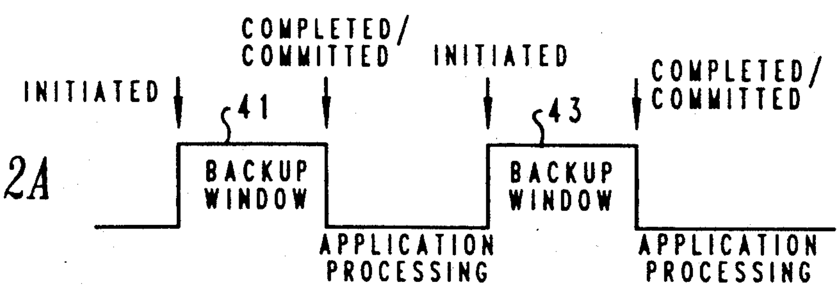
FIGS. 2A–2B depict time line illustrations of the backup window in a batch or streaming process in the prior art and in a time zero backup system
Figure 2B:
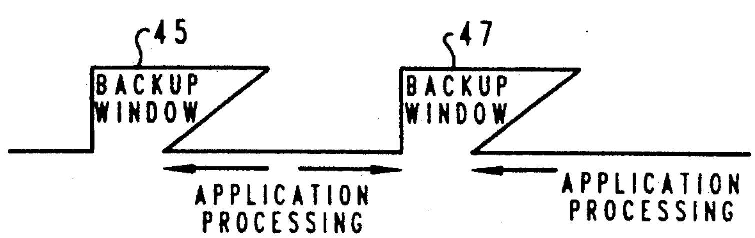

Referring now to FIGS. 2A–2B, there are depicted time lines illustrating the backup window in a batch or streaming process in the prior art and in a time zero backup system. As illustrated at FIG. 2A, multiple backup operations have occurred, as indicated at backup windows 41 and 43. Application processing is typically suspended or shut down just prior to each backup window and this suspension will persist until the backup process has been completed. Termination of the backup window signifies completion of the backup process and commitment. By "completion" what is meant is that all data that was to have been copied was in fact read from the source. By "commitment" what is meant is that all data to be copied was in fact written to an alternate storage location.

Referring now to FIG. 2B, backup windows for a time zero backup copy system are depicted. As described in detail within the copending cross-referenced patent application, each backup window 45 and 47 still requires the suspension or termination of application processing; however, the suspension or termination occurs only for a very short period of time. As described in the cross-referenced application, the time zero backup method begins, effectively freezing data within the datasets to be backed up at that point in time. Thereafter, a bit map is created identifying each track within the datasets to be backed up and after creation of that bit map, the copy is said to be "logically complete." The committed state, or "physically complete" state will not occur until some time later. However, at the "logically complete" point in time, the data is completely usable by applications within the data processing system. The time during which application processing is suspended in such a system is generally in the low subsecond range; however, those skilled in the art will appreciate that the amount of time required to create a bit map to the data to be copied will depend upon the amount of data within the datasets.

Of course, those skilled in the art will appreciate that if the time zero backup process terminates abnormally between the point of logical completion and the point of physical completion, the backup copy is no longer useful and the process must be restarted. In this respect, the time zero backup process is vulnerable in a manner very similar to that of backup systems in the prior art. That is, all backup operations must be rerun if the process terminates abnormally prior to completion.

Figure 3:
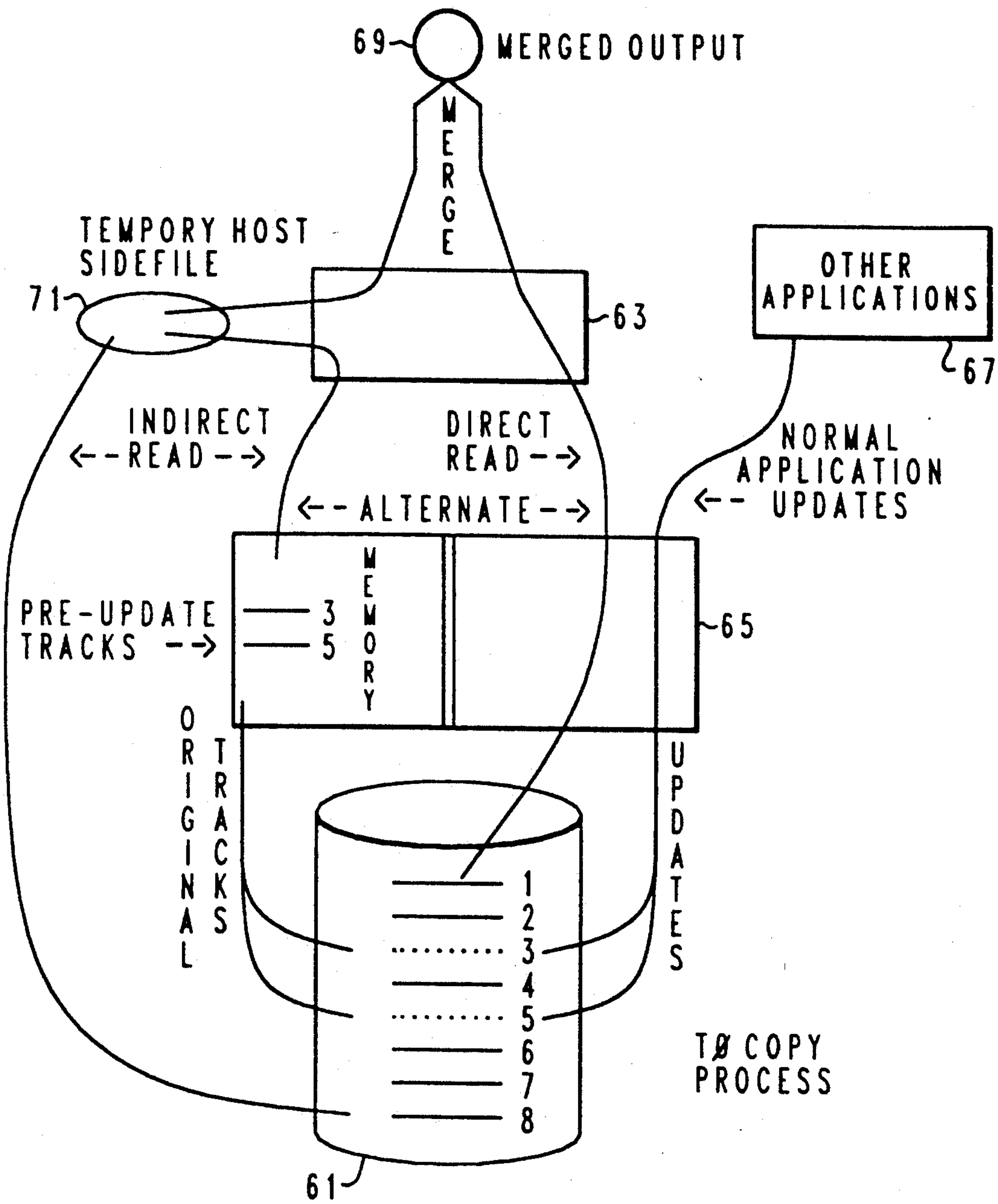
FIG. 3 illustrates a conceptual flow of a time zero backup copy in accordance with the method and system of the present invention.

With reference now to FIG. 3, there is depicted a conceptual flow of the creation of a time zero backup copy in accordance with the method and system of the present invention. As illustrated, a time zero backup copy of data within a tracked cyclic storage device 61 may be created. As those skilled in the art will appreciate, data stored within such a device is typically organized into records and datasets. The real address of data within external storage is generally expressed in terms of Direct Access Storage Device (DASD) volumes, cylinders and tracks. The virtual address of such data is generally couched in terms of base addresses and offsets and/or extents from such base addresses.

Further, a record may be of the count-key-data format. A record may occupy one or more units of real storage. A "dataset" is a logical collection of multiple records which may be stored on contiguous units of real storage or which may be dispersed. Therefore, those skilled in the art will appreciate that if backup copies are created at the dataset level it will be necessary to perform multiple sorts to form inverted indices into real storage. For purposes of explanation of this invention, backup processing will be described as managed both at the resource manager level within a data processing system and at the storage control unit level.

As described above, each processor typically includes an operating system which includes a resource manager component. Typically, an IBM System 370 type processor running under the MVS operating system will include a resource manager of the data facilities dataset services (DFDSS) type which is described in U.S. Pat. No. 4,855,907, Ferro et al., issued Aug. 8, 1989, entitled *Method for Moving VSAM Base Clusters While Maintaining Alternate Indices Into the Cluster.* DFDSS is also described in IBM Publication GC26-4388, entitled Data Facility Dataset Services: User's Guide. Thus, a resource manager 63 is utilized in conjunction with a storage control unit 65 to create an incremental backup copy of designated datasets stored within tracked cyclic storage device 61.

As will be described below, the backup copy process includes an initialization period during which datasets are sorted, one or more bit maps are created and logical completion of the bit map is signaled to the invoking process at the processor. The listed or identified datasets are then sorted according to access path elements down to DASD track granularity. Next, bit maps are constructed which correlate the dataset and the access path insofar as any one of them is included or excluded from a given copy session. Lastly, resource manager 63 signals logical completion, indicating that updates will be processed against the dataset only after a short delay until such time as physical completion occurs.

Following initialization, resource manager 63 begins reading the tracks of data which have been requested. As will be explained in greater detail herein, this is accomplished by utilizing a unique control block within the data processing system which identifies a particular storage device, in association with a data retrieval command sequence which identifies specific data to be read. While a copy session is active, each storage control unit monitors all updates to the dataset. If an update is received from another application 67, storage control unit 65 will execute a predetermined algorithm to process that update, as described below.

In a time zero backup copy system a determination is first made as to whether or not the update attempted by application 67 is for a volume which is not within the current copy session. If the volume is not within the current copy session, the update completes normally. Alternately, if the update is for a volume which is part of the copy session, the primary session bit map is checked to see if that track is protected. If the corresponding bit within the bit map is off, indicating the track is not currently within a copy session, the update completes normally. However, if the track is protected (the corresponding bit within the bit map is on) the track in question is part of the copy session and has not as yet been read by the resource manager 63. In such a case, storage control unit 65 temporarily buffers or defers the update and writes a copy of the affected track into a memory within storage control unit 65. Thereafter, the update is permitted to complete.

Thus, as illustrated in FIG. 3, an update initiated by application 67 may be processed through storage control unit 65 to update data at tracks 3 and 5 within tracked cyclic storage unit 61. Prior to permitting the update to occur, tracks 3 and 5 are written as sidefiles to a memory within storage control unit 65 and thereafter, the update is permitted to complete. The primary bit map is then altered to indicate that the copies of tracks 3 and 5, as those tracks existed at the time a backup copy was requested, are no longer within tracked cyclic storage device 61 but now reside within a memory within storage control unit 65.

A merged copy, representing the designated dataset as of the time a backup copy was requested, is then created at reference numeral 69, by copying non-updated tracks directly from tracked cyclic storage device 61 through resource manager 63, or by indirectly copying those tracks from tracked cyclic storage device 61 to a temporary host sidefile 71, which may be created within the expanded memory store of a host processor. Additionally, tracks within the dataset which have been written to sidefiles within a memory in storage control unit 65 prior to completion of an update may also be indirectly read from the memory within storage control unit 65 to the temporary host sidefile 71. Those skilled in the art will appreciate that in this manner a copy of a designated dataset may be created from unaltered tracks within tracked cyclic storage device 61, from preupdated tracks stored within memory of storage control unit 65 and thereafter transferred to temporary host sidefile 71, wherein these portions of the designated dataset may be merged in backup copy order, utilizing the bit map which was created at the time the backup copy was initiated.

Figure 4:
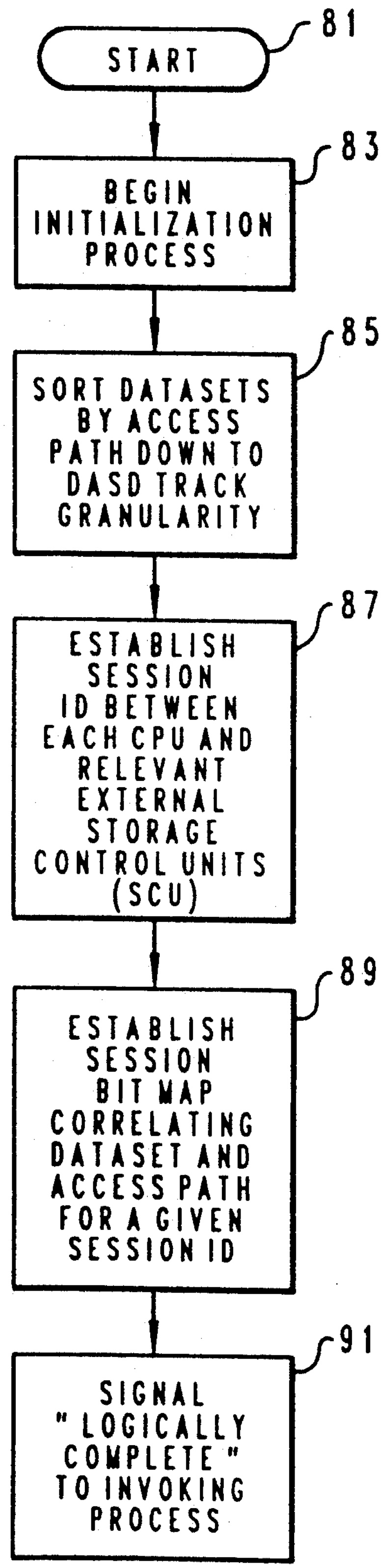
FIG. 4 is a high level flowchart illustrating initialization of a time zero backup copy in accordance with the method and system of the present invention.

Referring now to FIG. 4, there is depicted a high level logic flowchart which illustrates the initialization of a process for creating a time zero backup copy, in accordance with the method and system of the present invention. As illustrated, this process starts at block 81 and thereafter passes to block 83 which illustrates the beginning of the initialization process. Thereafter, the process passes to block 85 which depicts the sorting of the datasets by access path, down to DASD track granularity. This sorting process will, necessarily, resolve an identification of the DASD volumes within which the datasets reside and the identification of the storage control units to which those volumes belong.

Next, as depicted at block 87, a session identification is established between each processor and the relevant external storage control units. The session identification is preferably unique across all storage control units, in order that multiple processors will not interfere with each others' backup copy processes. Thereafter, as illustrated at block 89, a session bit map is established which may be utilized, as set forth in detail herein and within the cross-referenced patent application, to indicate whether or not a particular track is part of the present copy session. Thereafter, as depicted at block 91, the "logically complete" signal is sent to the invoking process, indicating that application processing may continue; however, slight delays in updates will occur until such time as the backup copy is physically complete.

Figure 5:
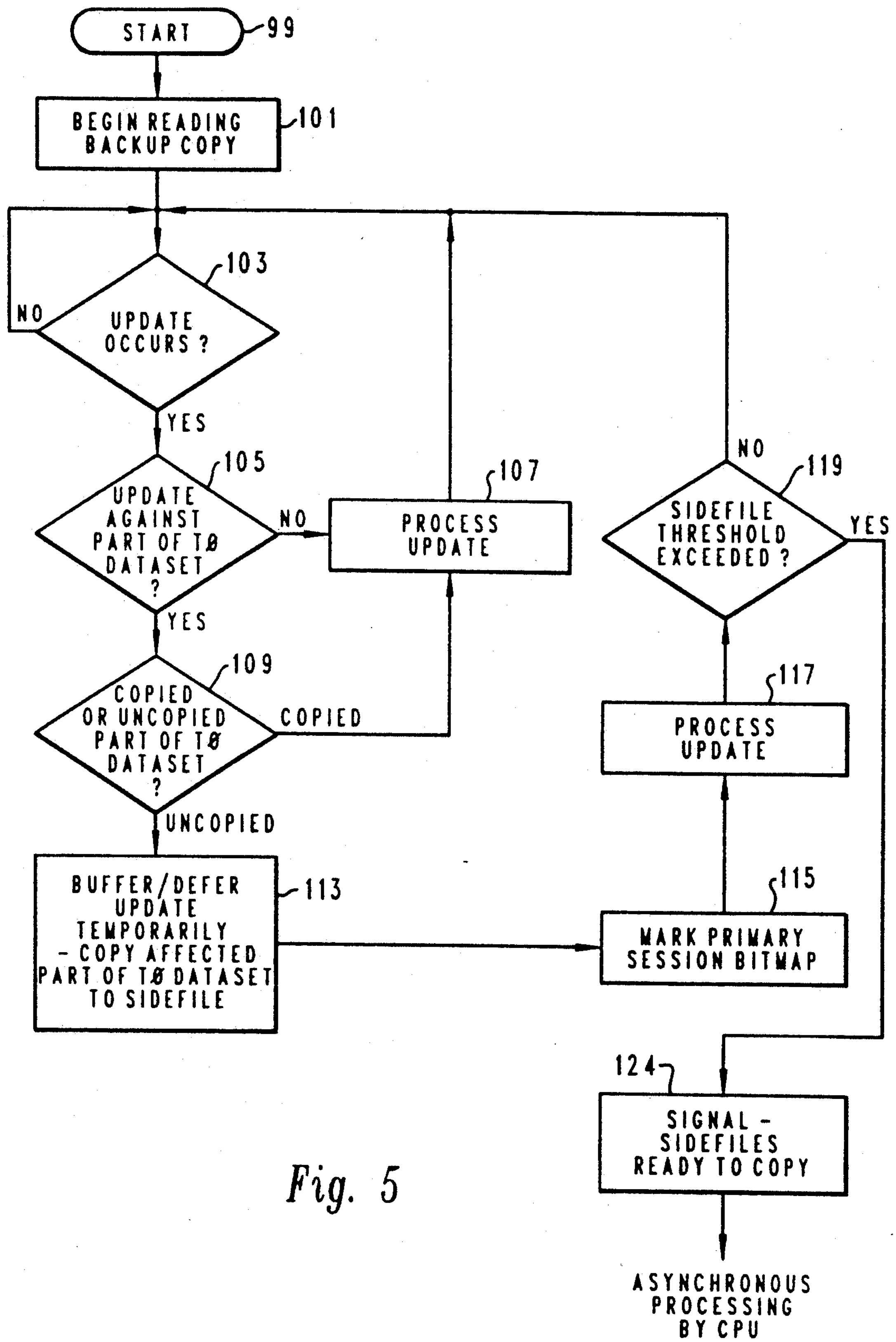
FIG. 5 is a high level logic flowchart illustrating backup copying in accordance with the method and system of the present invention.

With reference now to FIG. 5, there is depicted a high level logic flowchart which illustrates the backup copying of a dataset in accordance with the method and system of the present invention. As illustrated, the process begins at block 99 and thereafter passes to block 101. Block 101 depicts the beginning of the reading of a backup copy. The process then passes to block 103 which illustrates a determination of whether or not an update has occurred. In the event no update has occurred, the process merely iterates until such time as an update does occur. In the event an update has occurred, the process passes to block 105. Block 105 illustrates a determination of whether or not the update initiated by an application within the data processing system is an update against a portion of the time zero dataset. If not, the process merely passes to block 107 and the update is processed in a normal fashion. However, in the event the update is against a portion of the time zero dataset, the process passes to block 109.

Block 109 illustrates a determination of whether or not the update is against a copied or uncopied portion of the time zero dataset. That is, an update to a portion of data within the dataset which has been copied to the backup copy and is therefore physically complete, or a portion which has not yet been copied to the backup copy or exists in a sidefile. If the portion of the dataset against which the update is initiated has already been copied to the backup copy or resides in a sidefile, the process passes to block 107 which illustrates the processing of the update. Again, the process then passes from block 107 to block 103, to await the occurrence of the next update.

Referring again to block 109, in the event the update against the time zero dataset is initiated against a portion of the time zero dataset which has not yet been copied to the backup copy, the process passes to block 113. Block 113 illustrates the temporary deferring or buffering of the update and the copying of the affected portion of the time zero dataset to a sidefile within memory within the storage control unit (see FIG. 3). Thereafter, the process passes to block 115, which illustrates the marking of the session bit map, indicating to the resource manager that this portion of the dataset has been updated within the external storage subsystem and that the time zero copy of this portion of the dataset is now either within memory within storage control unit 65 or within temporary host sidefile 71 which is utilized to prevent overflow of data within the memory within storage control unit 65 (see FIG. 3).

After marking the session bit map, the process passes to block 117 which illustrates the processing of that update. Thereafter, the process passes to block 119 which depicts a determination of whether or not the sidefile threshold within the memory of storage control unit 65 has been exceeded. If so, the process passes to block 121, which illustrates the generation of an attention signal, indicating that sidefiles within the storage control unit are ready to be copied by the processor. Of course, those skilled in the art will appreciate that a failure to copy data from the memory within storage control unit 65 may result in the corruption of the backup copy if that memory is overwritten. Referring again to block 119, in the event the sidefile threshold has not been exceeded, the process returns again to block 103 to await the occurrence of the next update.

The asynchronous copying of sidefile data from a memory within storage control unit 65 to a temporary host sidefile, or to the merged backup copy, is described in detail within the cross-referenced patent application, as well as the process by which merged copies are created which incorporate data read directly from tracked cyclic storage unit 61, data within memory within storage control unit 65 and/or data within temporary host sidefile 71.

Figure 6:
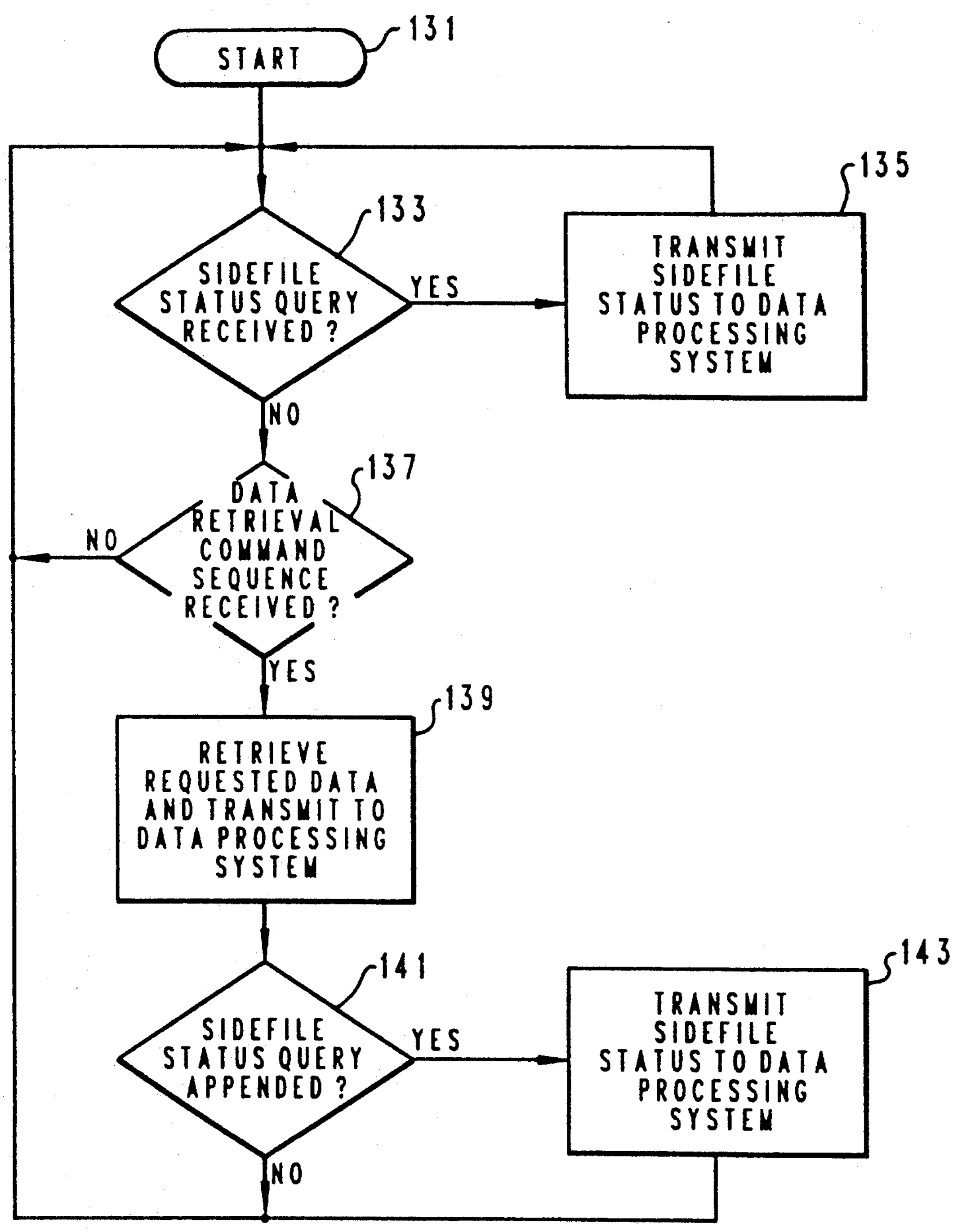
FIG. 6 is a high level logic flowchart illustrating automatic sidefile polling in accordance with the method and system of the present invention.

Referring now to FIG. 6, there is depicted a high level logic flowchart which illustrates automatic sidefile polling in accordance with the method and system of the present invention. As will be appreciated upon reference to the foregoing, if the level of data within subsystem memory exceeds one or more selected threshold levels, attention signals may be automatically transmitted to the data processing system, indicating the data within subsystem memory must be transferred from that location to alternate storage prior to the overwriting of data within subsystem memory and a resultant corruption of the backup copy data contained therein.

Those skilled in the art will appreciate that such a system, incorporating so-called "attention" signals will provide a monitor system which may be utilized to notify the data processing system when data must be copied; however, the efficiency of the backup copy process may be greatly enhanced by providing a sidefile status query which may be transmitted to storage system control unit 65 (see FIG. 3) as a selected Channel Control Word (CCW). Further, as will be explained in greater detail below, the sidefile status query may be appended to a data retrieval command sequence, eliminating the communications overhead which might otherwise be necessary to establish communication between the data processing system and the storage subsystem. The sidefile status query may then be utilized to determine if data is present within the subsystem memory, allowing the data processing system to copy that data during periods of low channel utilization, greatly enhancing the efficiency of the backup copy process.

The automatic sidefile polling method of the present invention begins, as illustrated in FIG. 6, at block 131 and thereafter passes to block 133. Block 133 illustrates a determination of whether or not a sidefile status query has been received and if so, the process passes to block 135. Block 135 illustrates the transmittal of sidefile status to the data processing system and if the sidefile area within subsystem memory is not empty, a data retrieval command may be issued to read the sidefile data from the subsystem memory within the storage subsystem control unit to the data processing system. Thereafter, the process will return iteratively to block 133.

Referring again to block 133, in the event a sidefile status query is not received, the process passes to block 137. Block 137 illustrates a determination of whether or not a data retrieval command sequence has been received. If not, the process again returns iteratively to block 133 to await the arrival of a sidefile status query message or, a data retrieval command sequence or other appropriate message. In the event a data retrieval command sequence has been received the process passes to block 139.

Block 139 illustrates the retrieval of the requested data and the transmittal of that data to the data processing system. Thereafter, as above, the process passes to block 141 which illustrates a determination of whether or not a sidefile status query was appended to the received data retrieval command sequence and, if so, the process passes to block 143. As above, block 143 illustrates the transmittal of the sidefile status to the data processing system. Referring again to block 141, in the event a sidefile status query has not been appended to the data retrieval command sequence, or after transmitting the sidefile status to the data processing system, in the event a sidefile status query was appended, the process returns to block 133 to await the arrival of a sidefile status query, a data retrieval command sequence, or other appropriate command.

Upon reference to the foregoing those skilled in the art will appreciate that the method and system of the present invention provides an efficient method whereby the status of sidefile copies of affected updated designated dataset portions may be determined by the data processing system so that data may be transmitted to the data processing system in a manner which greatly enhances the efficiency of the backup copy process.

While the invention has been particularly shown and described with reference to a preferred embodiment, it will be understood by those skilled in the art that various changes in form and detail may be made therein without departing from the spirit and scope of the invention.

We claim:

1. A method in a data processing system for enhanced efficiency of backup copying of designated datasets stored within a storage subsystem comprising a plurality of storage devices which are coupled to said data processing system via a storage device control unit having subsystem memory therein, said method comprising the steps of:

forming a dataset logical-to-physical system address concordance for said designated datasets to be utilized to administer copying of said designated datasets;

processing at said storage subsystem any application initiated update to uncopied portions of said designated datasets by temporarily deferring said updates, writing sidefiles of said designated datasets or portions thereof affected by said update to said subsystem memory and thereafter writing said updates to said storage subsystem;

accessing and copying said designated datasets within said storage subsystem on a scheduled or opportunistic basis by issuing data retrieval command sequences from said data processing system to said storage subsystems;

periodically appending a sidefile status query to a data retrieval command sequence wherein a determination of data presence within said subsystem memory may be accomplished; and selectively accessing and copying said sidefiles in response to a determination of data presence within said subsystem memory.

2. The method in a data processing system for enhanced efficiency of backup copying of designated datasets according to claim 1, further including the step of temporarily suspending application execution within said data processing system prior to forming said dataset logical-to-physical system address concordance for said designated datasets.

3. The method in a data processing system for enhanced efficiency of backup copying of designated datasets according to claim 2, further including the step of resuming application execution within said data processing system subsequent to forming said dataset logical-to-physical system address concordance for said designated datasets.

4. The method in a data processing system for enhanced efficiency of backup copying of designated datasets according to claim 1, further including the step of writing said copied designated datasets and sidefiles to an alternate storage location in a backup copy order specified by said address concordance.

5. A data processing system for enhanced efficiency of backup copying of designated datasets stored within a storage subsystem comprising a plurality of storage devices which are coupled to said data processing system via a storage device control unit having subsystem memory therein, said data processing system comprising:

means for forming a dataset logical-to-physical system address concordance for said designated datasets to be utilized to administer copying of said designated datasets;

means for processing at said storage subsystem any application initiated update to uncopied portions of said designated datasets by temporarily deferring said updates, writing sidefiles of said designated datasets or portions thereof affected by said update to said subsystem memory and thereafter writing said updates to said storage subsystem;

means for accessing and copying said designated datasets within said storage subsystem on a scheduled or opportunistic basis by issuing data retrieval command sequences from said data processing system to said storage subsystems;

means for periodically appending a sidefile status query to a data retrieval command sequence wherein a determination of data presence within said subsystem memory may be accomplished; and means for selectively accessing and copying said sidefiles in response to a determination of data presence within said subsystem memory.

6. The data processing system for enhanced efficiency of backup copying of designated datasets according to claim 5, further including means for temporarily suspending application execution within said data processing system prior to forming said dataset logical-to-physical system address concordance for said designated datasets.

7. The data processing system for enhanced efficiency of backup copying of designated datasets according to claim 6, further including means for resuming application execution within said data processing system subsequent to forming said dataset logical-to-physical system address concordance for said designated datasets.

8. The data processing system for enhanced efficiency of backup copying of designated datasets according to claim 5, further including means for writing said copied designated datasets and sidefiles to an alternate storage location in a backup copy order defined by said address concordance.

9. A method in a data processing system for enhanced efficiency of backup copying of designated datasets stored within a storage subsystem comprising a plurality of storage devices which are coupled to said data processing system via a storage device control unit having subsystem memory therein, said method comprising the steps of:

forming a dataset logical-to-physical system address concordance for said designated datasets to be utilized to administer copying of said designated datasets;

processing at said storage subsystem any application initiated update to uncopied portions of said designated datasets by temporarily deferring said updates, writing sidefiles of said designated datasets or portions thereof affected by said update to said subsystem memory and thereafter writing said updates to said storage subsystem;

accessing and copying said designated datasets within said storage subsystem on a scheduled or opportunistic basis by issuing data retrieval command sequences from said data processing system to said storage subsystems;

periodically issuing a sidefile status query to determine the status of data within said subsystem memory; and selectively accessing and copying said sidefiles in response to a determination of data presence within said subsystem memory.

10. The method in a data processing system for enhanced efficiency of backup copying of designated datasets according to claim 9, further including the step of temporarily suspending application execution within said data processing system prior to forming said dataset logical-to-physical system address concordance for said designated datasets.

11. The method in a data processing system for enhanced efficiency of backup copying of designated datasets according to claim 10, further including the step of resuming application execution within said data processing system subsequent to forming said dataset logical-to-physical system address concordance for said designated datasets.

12. A data processing system for enhanced efficiency of backup copying of designated datasets stored within a storage subsystem comprising a plurality of storage devices which are coupled to said data processing system via a storage device control unit having subsystem memory therein, said data processing system comprising:

means for forming a dataset logical-to-physical system address concordance for said designated datasets to be utilized to administer copying of said designated datasets;

means for processing at said storage subsystem any application initiated update to uncopied portions of said designated datasets by temporarily deferring said updates, writing sidefiles of said designated datasets or portions thereof affected by said update to said subsystem memory and thereafter writing said updates to said storage subsystem;

means for accessing and copying said designated datasets within said storage subsystem on a scheduled or opportunistic basis by issuing data retrieval command sequences from said data processing system to said storage subsystems;

means for periodically issuing a sidefile status query to determine the status of data within said subsystem memory; and means for selectively accessing and copying said sidefiles in response to a determination of data presence within said subsystem memory.

13. The data processing system for enhanced efficiency of backup copying of designated datasets according to claim 12, further including means for temporarily suspending application execution within said data processing system prior to forming said dataset logical-to-physical system address concordance for said designated datasets.

* * * * *

UNITED STATES PATENT AND TRADEMARK OFFICE

CERTIFICATE OF CORRECTION

PATENT NO. : 5,241,669

DATED : August 31, 1993

INVENTOR(S) : Oded Cohn et al.

It is certified that error appears in the above-indentified patent and that said Letters Patent is hereby corrected as shown below:

On the Title page, item [75], Inventors; please add

--Yoram Novick, Haifa, Israel-- and --Alexander Winokur, Haifa, Israel--.

Signed and Sealed this

Twentieth Day of February, 1996

Attest:

BRUCE LEHMAN

*Attesting Officer*

*Commissioner of Patents and Trademarks*